(12) United States Patent
Shin

(10) Patent No.: US 6,619,070 B2
(45) Date of Patent: Sep. 16, 2003

(54) KIMCHI REFRIGERATOR

(75) Inventor: Kyu-Ho Shin, Kwangju (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/099,949

(22) Filed: Mar. 19, 2002

(65) Prior Publication Data
US 2002/0194861 A1 Dec. 26, 2002

(30) Foreign Application Priority Data
Jun. 23, 2001 (KR) ........................ 2001-36017

(51) Int. Cl.[7] ............... F25D 17/04; F25D 11/00
(52) U.S. Cl. ................................ 62/440; 62/407
(58) Field of Search ................ 62/440, 407, 406, 62/417, 449, 263, 64, 48.1, 470

(56) References Cited

U.S. PATENT DOCUMENTS 4,008,492 A * 2/1977 Elsing .................. 360/97.03
5,947,197 A * 9/1999 Lee et al. ................ 165/263
6,253,668 B1 * 7/2001 Lee ........................ 165/206

FOREIGN PATENT DOCUMENTS

JP 08214804 A * 8/1996

* cited by examiner

Primary Examiner—Chen Wen Jiang
(74) Attorney, Agent, or Firm—Staas & Halsey LLP

(57) ABSTRACT

A kimchi refrigerator according to the present invention is provided with an improved door structure capable of reducing the temperature difference between areas of different heights in a storage compartment. In the kimchi refrigerator, an air separation panel is mounted to a lower surface of the door which together with a depression under the door's lower surface defines an air storage chamber. The air storage chamber contains air having a raised temperature due to heat transferred from air inside the storage compartment. The air separation panel separates the air inside the air storage chamber from the air inside the storage compartment. Accordingly, the kimchi refrigerator reduces the temperature difference between the areas of different heights within the storage compartment, and creates a uniform temperature distribution in the storage compartment. Therefore, appropriately fermented kimchi contained throughout the storage compartment is kept cool for a lengthy period of time, and over-fermentation of the kimchi is prevented in an upper area of the storage compartment.

21 Claims, 7 Drawing Sheets

KIMCHI REFRIGERATOR

CROSS-REFERENCE TO RELATED APPLICATIONS

This application claims the benefit of Korean Application No. 2001-36017, filed Jun. 23, 2001, in the Korean Industrial Property Office, the disclosure of which is incorporated herein by reference.

BACKGROUND OF THE INVENTION

1. Field of the Invention

The present invention relates to kimchi refrigerators used to appropriately ferment a kimchi and to keep the kimchi cool in a desired state for a lengthy period of time. More particularly, the present invention relates to a kimchi refrigerator provided with a door at a top of a cabinet for closing a storage compartment.

2. Description of the Related Art

Storing a kimchi in a well controlled temperature is important to prevent over-fermentation and souring of the kimchi. Kimchi refrigerators are specifically designed to appropriately ferment a newly pickled kimchi using a heating unit, in accordance with a users taste, and to keep the fermented kimchi cool in a desired state for a lengthy period of time using an evaporator constituting a refrigerating cycle.

FIG. 1 shows a conventional kimchi refrigerator having a cabinet 1 partitioned in its interior into a storage compartment 2a and a machine compartment 4. An evaporator 5 and a heater 6 are set in a sidewall of the cabinet 1, while a door 8 is mounted to a top edge of the cabinet 1 by a hinged joint 8a so as to close the storage compartment 2a. The door 8 allows a user to access the compartment 2a of the kimchi refrigerator.

The cabinet 1 includes an inner casing 2 which has a box shape and is open at its top to form the storage compartment 2a, and an outer casing 3 which encloses the inner casing 2. A gap formed between the inner and outer casings 2 and 3 is filled with an insulating material to form an insulation wall 7.

The evaporator 5 comprises a coiled refrigerant pipe, which is installed in the cabinet 1 to surround an external surface of the sidewall of the inner casing 2. In the conventional kimchi refrigerator, the evaporator 5 directly cools the inner casing 2 so as to reduce the temperature of the storage compartment 2a. The heater 6 comprises a heating coil, which is circumferentially arranged on the sidewall of the inner casing 2 to extend along the coiled refrigerant pipe of the evaporator 5.

The storage compartment 2a is kept cool by a heat conduction through the sidewall of the inner casing 2 installed with the evaporator 5, and through natural convection of cool air inside the compartment 2a. Similarly, a kimchi (not shown) in the storage compartment 2a is also kept cool. In addition, the top of the storage compartment 2a is opened by opening the door 8, and so a user easily takes a desired amount of the kimchi out of the compartment 2a.

However, the conventional kimchi refrigerator has a disadvantage in that there is a nonuniform temperature distribution, as shown by curves A of FIG. 1, along the height of the storage compartment 2a. That is, the evaporator 5 directly cools air inside the storage compartment 2a, and the newly cooled air flows downward to a lower area of the compartment 2a. Meanwhile, air raised in its temperature by absorbing heat from the kimchi, or atmospheric air introduced into the compartment 2a through the top opening of the compartment 2 flows upward to an upper area of the compartment 2a. Therefore, the temperature of the upper area inside the storage compartment 2a is higher than the temperature of the lower area. This nonuniform temperature distribution causes over-fermentation of the kimchi stored at the upper area of the compartment 2a near the door 8, and reduces the freshness of the kimchi so as to sour the kimchi.

SUMMARY OF THE INVENTION

Accordingly, it is an object of the present invention to provide a kimchi refrigerator with an improved door structure capable of reducing the temperature difference between areas of different heights in the storage compartment.

Additional objects and advantages of the invention will be set forth in part in the description which follows and, in part, will be obvious from the description, or may be learned by practice of the invention.

To achieve the above and other objects of the present invention, there is provided a kimchi refrigerator having a cabinet which defines a storage compartment and which is open at its top, an evaporator which cools air inside the cabinet and that is set within a sidewall of the cabinet, and a door which opens/closes the storage compartment mounted on a top of the cabinet, the door comprising an air storage chamber provided under a lower surface of the door, and an air separation panel, which separates air inside the air storage chamber from air inside the storage compartment, mounted to the lower surface of the door.

According to an aspect of the present invention, the air separation panel is made of an aluminum plate having a high heat conductivity.

According to another aspect of the present invention, the air separation panel is made of a heat nonconductive material, and includes a plurality of air guide holes which guide air flowing upward in the storage compartment into the air storage chamber.

According to yet another aspect of the present invention, each of the air guide holes has a diameter and which tapers to reduce the diameter toward the air storage chamber from the storage compartment.

According to still another aspect of the present invention, the door is provided with a depression on its lower surface spaced apart from the air separation panel so as to define the air storage chamber.

According to an additional aspect of the present invention, the door is provided with a locking groove on its lower surface formed along an edge of the depression, and the air separation panel is provided along its edge with a locking flange which is inserted into the locking groove.

BRIEF DESCRIPTION OF THE DRAWINGS

The above objects, features and advantages of the present invention will more apparent by describing in detail preferred embodiments thereof with reference to the attached drawings in which.

DETAILED DESCRIPTION OF THE INVENTION

Figure 1:
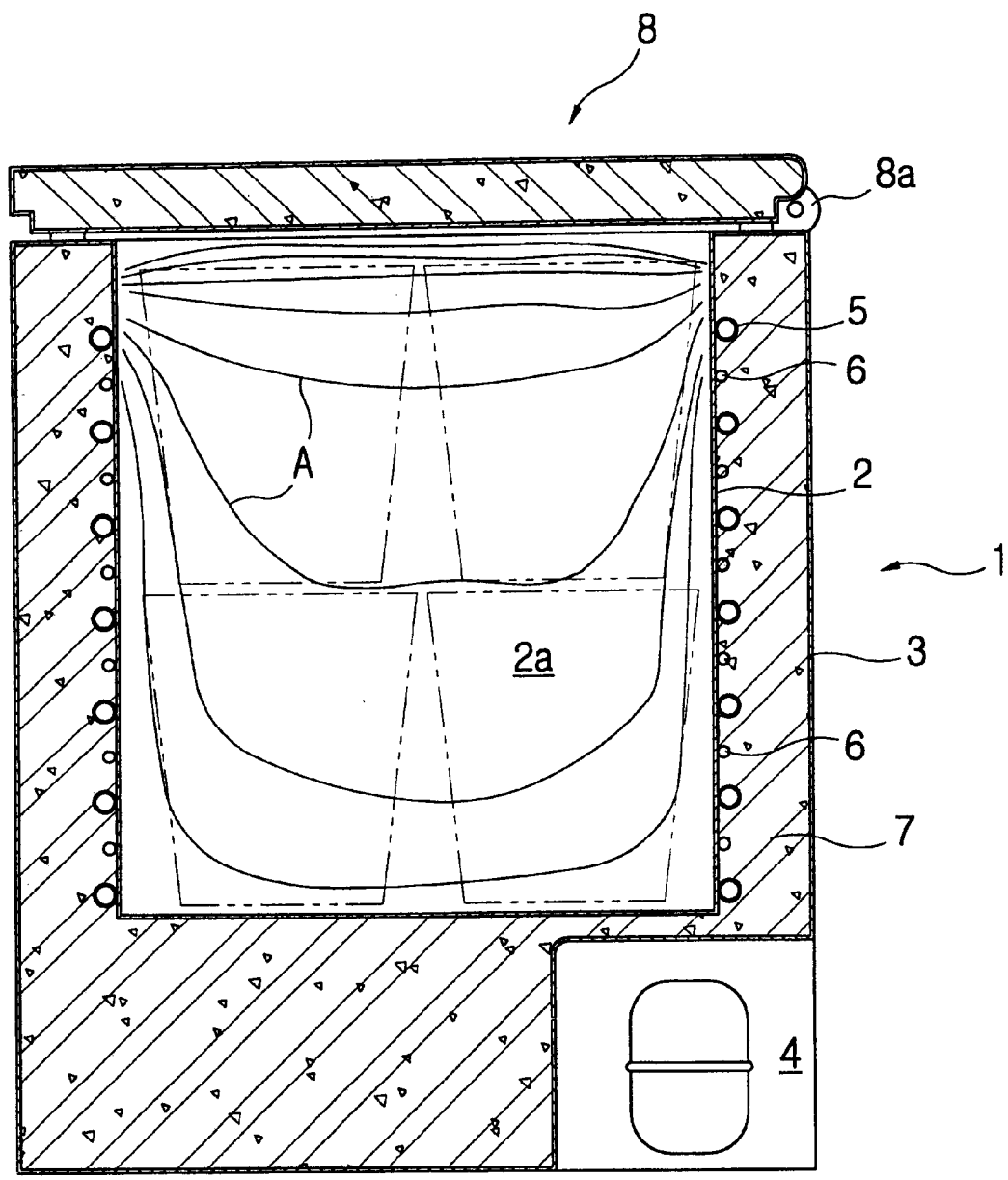
FIG. 1 is a side sectional view showing the construction of a conventional kimchi refrigerator.

Reference will now be made in detail to the present preferred embodiments of the present invention, examples of which are illustrated in the accompanying drawings, wherein like reference numerals to like elements throughout.

Figure 2:
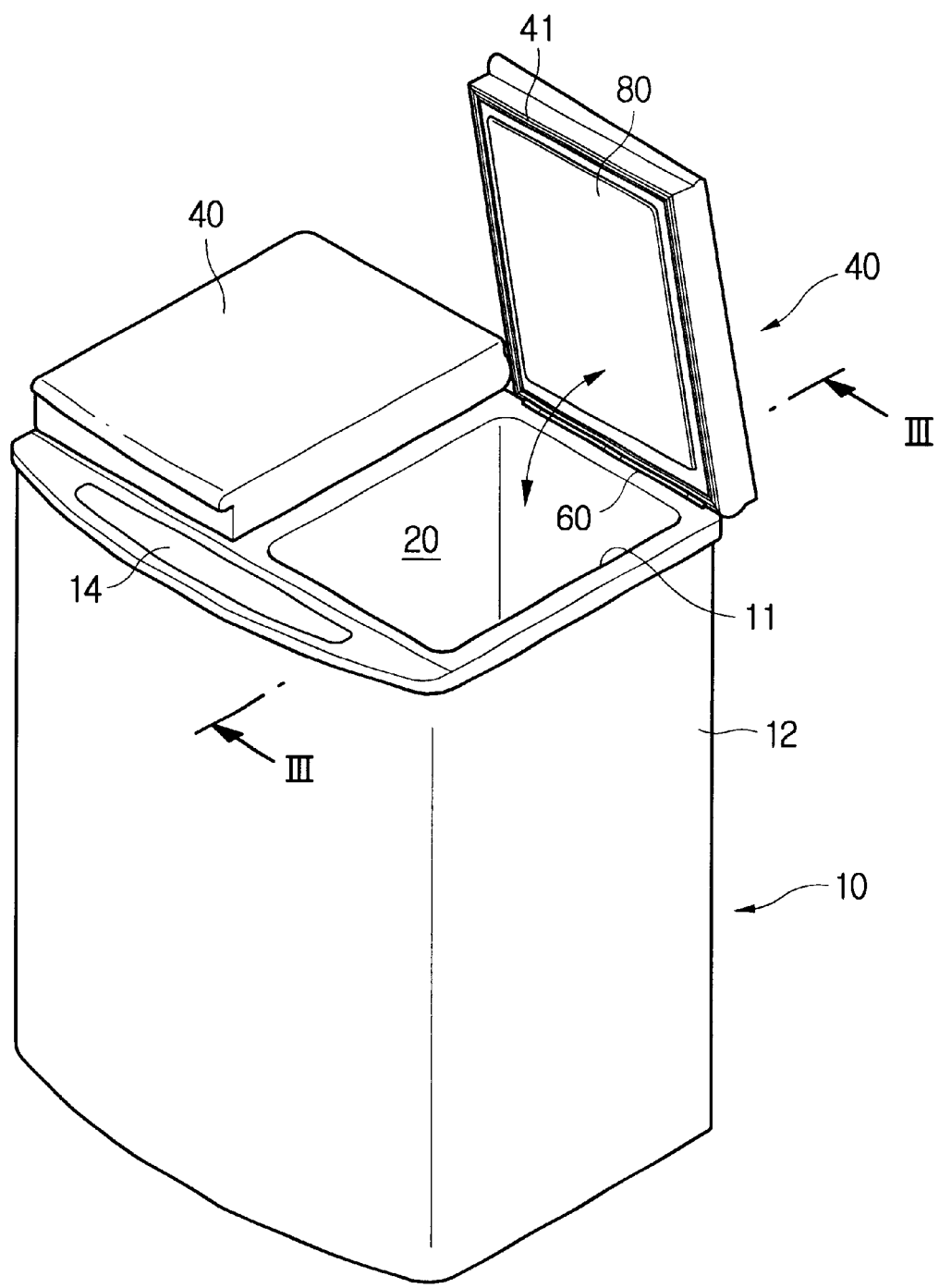
FIG. 2 is a perspective view showing a kimchi refrigerator according to an embodiment of the present invention.
Figure 3:
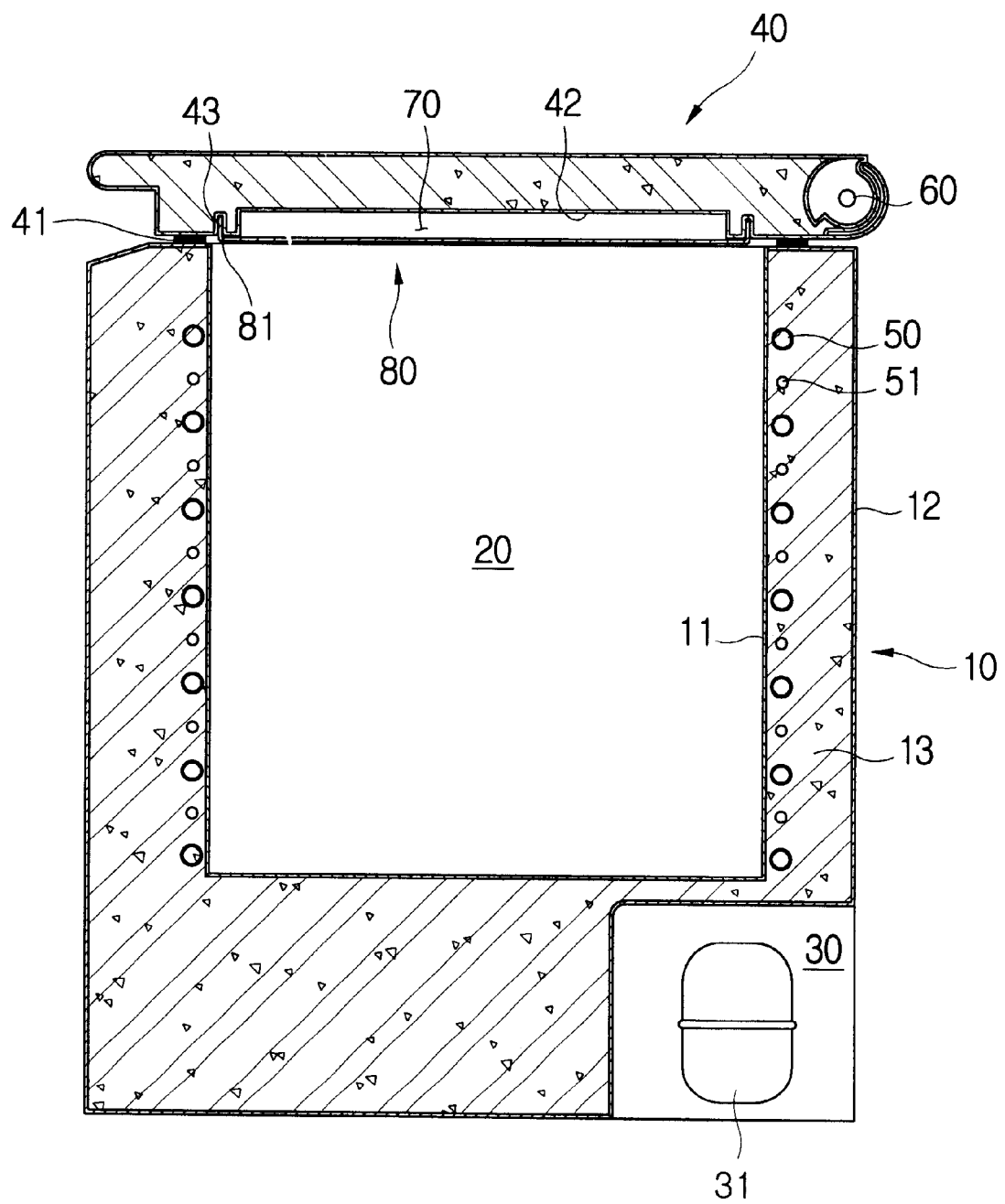
FIG. 3 is a side sectional view taken along the line 111—111 of FIG. 2, showing the construction of the kimchi refrigerator with a door closed.

FIGS. 2 and 3 show a kimchi refrigerator according to an embodiment of the present invention. The kimchi refrigerator includes a cabinet 10 partitioned in its interior into a storage compartment 20 and a machine compartment 30. A kimchi storage box (not shown) is stored in the storage compartment 20, while parts including a compressor 31, which constitutes a refrigerating cycle, is installed in the machine compartment 30. A door 40 is hinged to a top edge of the cabinet 10 so as to open and close the storage compartment 20. The cabinet 10 also has an electric heater 51 which performs a fermenting process of a kimchi. It is understood that additional parts are included to constitute the refrigerating cycle in addition to the compressor 31, but which are shown for the sake of simplicity.

The cabinet 10 includes an inner casing 11 which defines the storage compartment 20, and an outer casing 12 which houses the inner casing 11 and forms a gap between the inner and outer casings 11 and 12. The gap is filled with an insulating material to form an insulation wall 13. The inner casing 11 is made of a material having a high heat conductivity, such as aluminum. The outer casing 12 is fabricated by, for example, bending a metal sheet. The insulating material to form the insulator wall 13 includes a liquid urethane foam. A control panel 14 having a variety of control buttons (not shown) is provided on the cabinet 10. The control panel 14 controls the kimchi refrigerator, and stores a temperature control program which controls the temperature of the kimchi refrigerator.

An evaporator 50 which constitutes the refrigerating cycle, is set in the insulation wall 13 which fills the gap between the inner and outer casings 11 and 12. The evaporator 50 comprises a coiled refrigerant pipe which closely surrounds an external surface of a sidewall of the inner casing 11. The evaporator 50 directly cools the storage compartment 20, and is operated under the control of the control panel 14, which processes the temperature control program. The electric heater 51 comprises a heating coil which is circumferentially arranged along the outside of the sidewall of the inner casing 11 so as to extend along with the coiled refrigerant pipe of the evaporator 50. The heater 51 is operated under the control of the control panel 14 which processes the temperature control program.

A rear edge of the door 40 is coupled to a top rear edge of the cabinet 10 by a hinged joint 60, so as to rotate the door 40 as shown by the arrow of FIG. 2. A sealing gasket 41 is installed along the edge of the door's 40 lower surface. The gasket 41 comes into contact with the top edge of the cabinet 10 and closes the open top of the storage compartment 20 as the door 40 is closed.

An air separation panel 80, which defines an air storage chamber 70, is mounted to the lower surface of the door 40. The air storage chamber 70 formed under the doors 40 lower surface contains air, which is raised in its temperature due to heat transferred from air inside the storage compartment 20. The air separation panel 80 separates the air inside the chamber 70 from the air inside the storage compartment 20. Due to the air separation panel 80, the higher temperature air is resident in the chamber 70, and is effectively separated from the lower temperature air inside the storage compartment 20. Therefore, it is possible to reduce the temperature difference between areas of different heights within the storage compartment 20.

Figure 4:
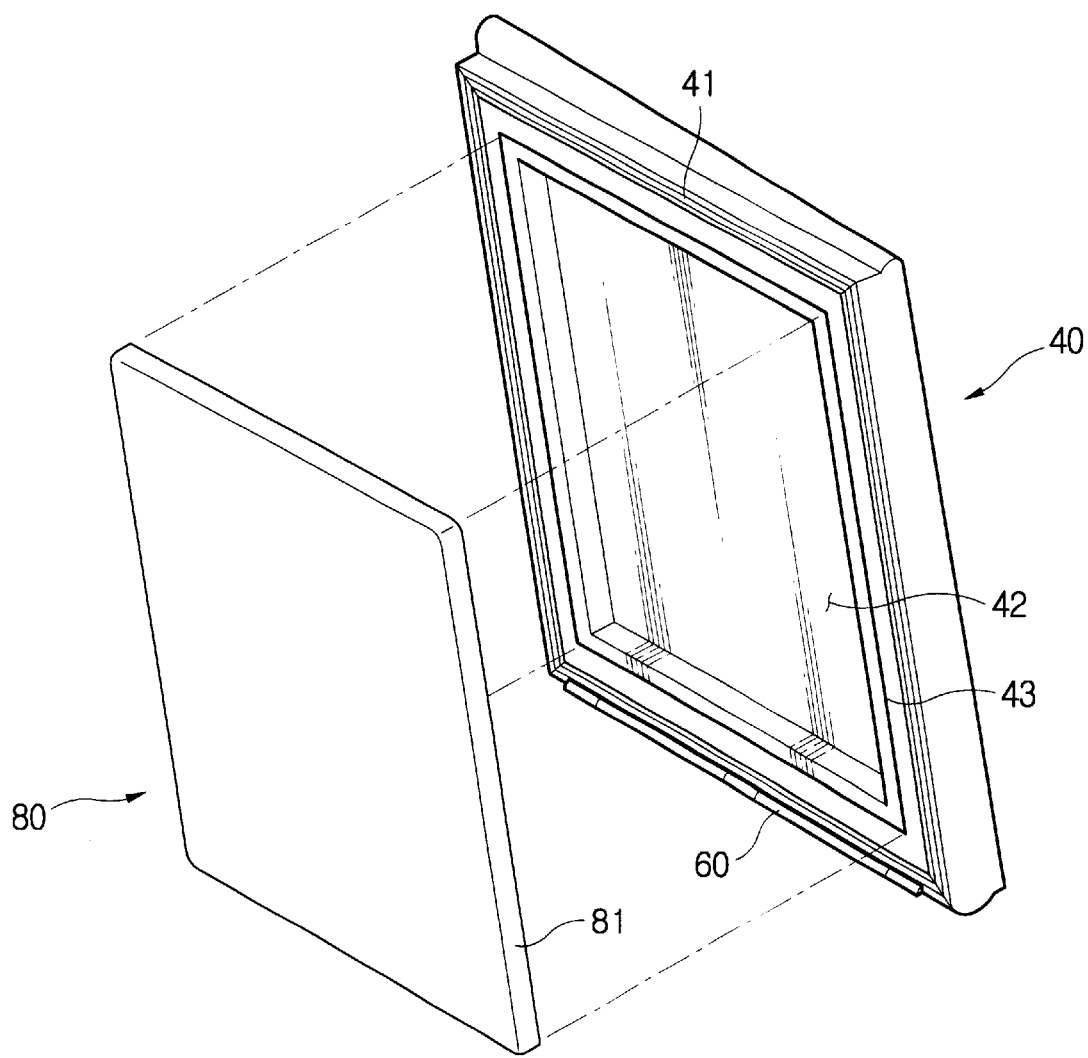
FIG. 4 is an exploded perspective view showing the door of the kimchi refrigerator provided with an air separation panel according to the embodiment of the present invention.

FIG. 4, with reference to FIG. 3, shows the bottom structure of the door 40 which is designed to reduce the temperature difference within the storage compartment 20. A depression 42 is formed on the lower surface of the door 40 to form the air storage chamber 70 under the lower surface of the door 40. The depression 42 is spaced apart from the air separation panel 80 mounted to the door 40 by a predetermined distance. The door 40 is provided with a locking groove 43 on its lower surface to hold the air separation panel 80. The locking groove 43 is continuously formed along a gap between an edge of the depression 42 and the gasket 41. However, it is understood that the locking groove 43 need not be used or continuous in all aspects of the invention.

According to an aspect of the present invention, the air separation panel 80 is made of a heat conductive material such as an aluminum plate, and is bent upward along its outer edge to form a locking flange 81, which is inserted into the locking groove 43 of the door 40. By inserting the locking flange 81 into the locking groove 43, the air separation panel 80 is firmly mounted to the lower surface of the door 40. The air separation panel 80 also covers the depression 42 formed in the door 40, thus forming the air storage chamber 70 which is separated from the outside of the panel 80. Therefore, heat from air flowing from a lower area to an upper area of the storage compartment 20 is transferred to air inside the air storage chamber 70, through the aluminum air separation panel 80.

The operational effect of the above-mentioned kimchi refrigerator will be described herein below.

When the kimchi refrigerator is operated in a refrigerating mode by manipulating the control panel 14, the evaporator 50 directly cools air inside the storage compartment 20. That is, the evaporator 50 reduces the temperature of the air inside the storage compartment 20 to a predetermined point through heat conduction at a sidewall of the inner casing 11. The cool air circulates in the compartment 20 due to natural convection. This cool air keeps the appropriately fermented kimchi stored in the compartment 20 cool and maintains the taste of the kimchi pleasant for a lengthy period of time by preventing over-fermentation of the kimchi.

In accordance with experiments carried out by the inventor of this invention, the storage compartment 20 of the present kimchi refrigerator was maintained at temperatures of $-1°$ C.~$1°$ C. In such a case, the lower area of the storage compartment 20 maintained temperatures of $-1°$ C.~$0°$ C., while the upper area of the storage compartment 20 maintained temperatures of $-0°$ C.~$1°$ C.

During the refrigerating mode of the kimchi refrigerator, the higher temperature air in the storage compartment 20 flows upward toward the door 40, comes into contact with the air separation panel 80, so as to dissipates heat using the air separation panel 80. In other words, the air separation panel 80 having high heat conductivity absorbs the heat from the air flowing upward in the storage compartment 20, thereby directly cooling said air. Thereafter, the air separation panel 80 dissipates the heat to the air inside the air storage chamber 70. The air inside the storage chamber 70 having a raised temperature is left in the storage chamber 70 and is separated from the cooler air inside the storage compartment 20.

That is, the air, flowing upward to the upper area of the storage compartment 20 and having a temperature higher than 1° C., dissipates the heat through the air separation panel 80. Therefore, the air in the upper area of the storage compartment 20 is cooled, and it is possible to reduce the temperature difference between the areas of different heights in the storage compartment 20 containing kimchi storage boxes. In addition, atmospheric air, having a temperature higher than that of the air inside the storage compartment 20, may be undesirably introduced into the storage compartment 20 through a gap between the top edge of the cabinet 10 and the gasket 41 of the door 40. However, the atmospheric air primarily comes into contact with the air separation panel 80 which also cools the atmospheric air. Therefore, the kimchi refrigerator of the present invention is also less likely to create a temperature difference between the areas in the storage compartment 20 due to an introduction of atmospheric air.

Figure 5:
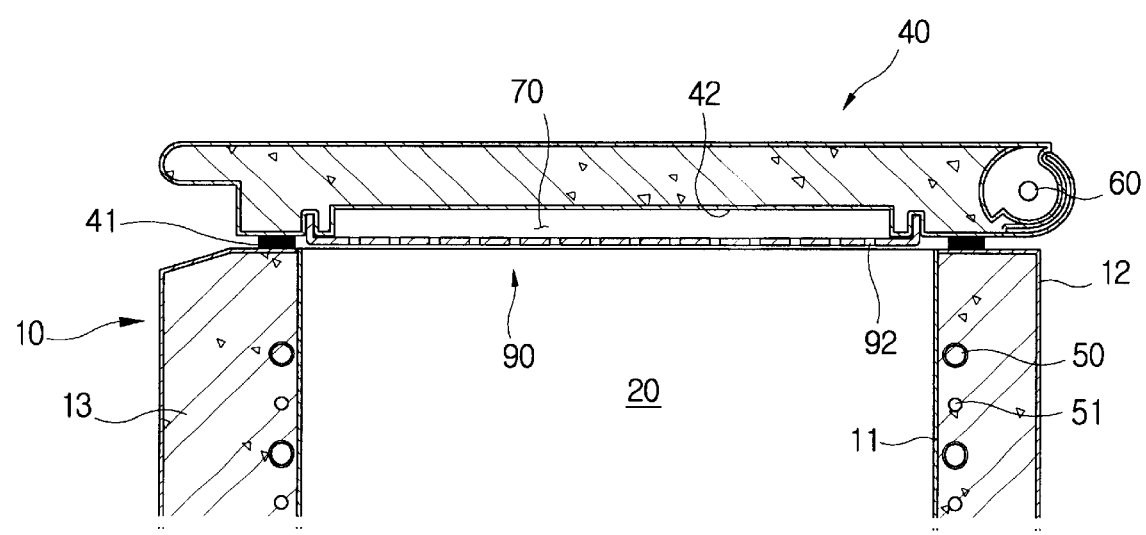
FIGS. 5 and 6 are a partial sectional view and an exploded perspective view showing the door provided with an air separation panel according to another embodiment of the present invention.
Figure 6:
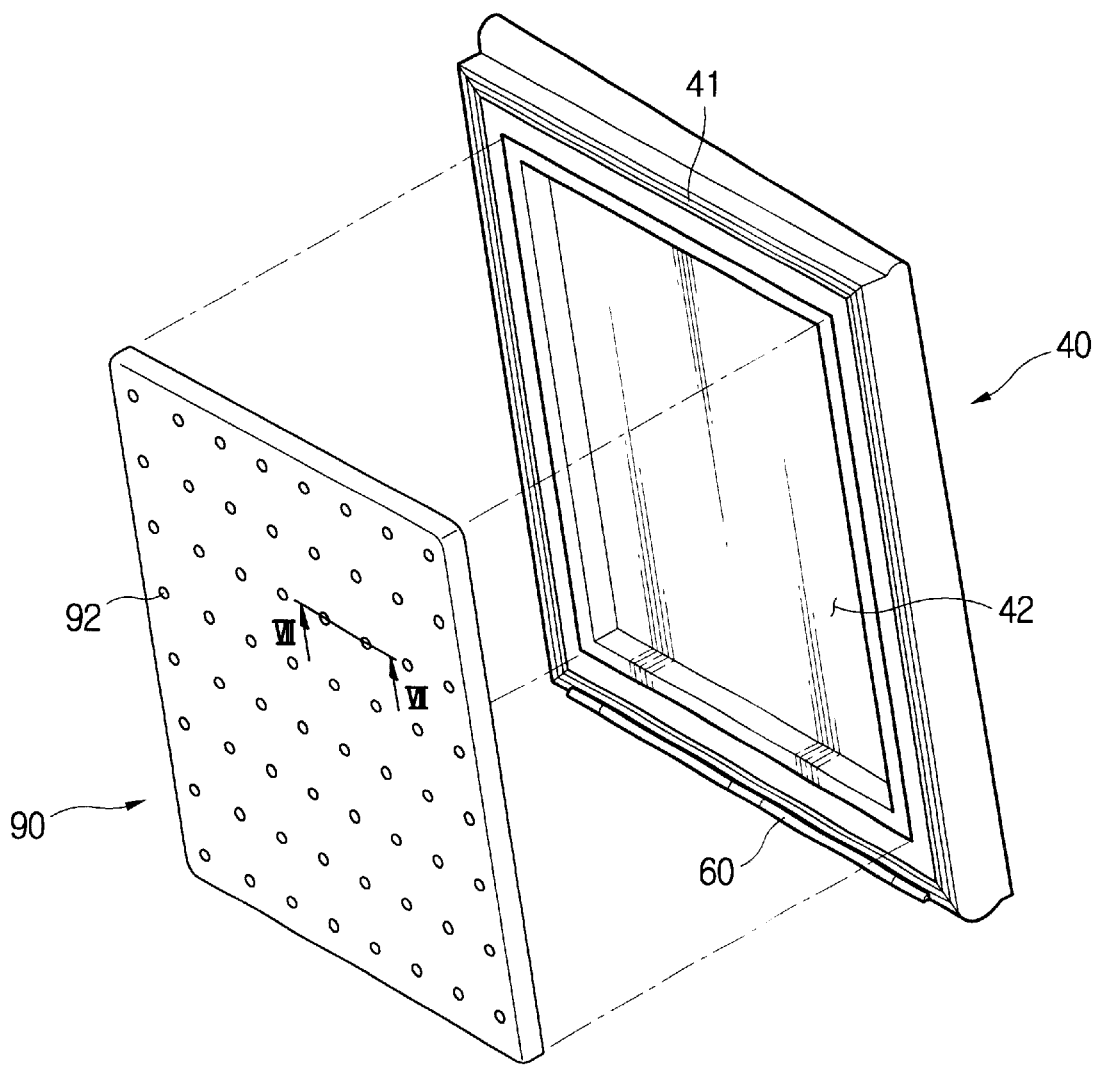
Figure 7:
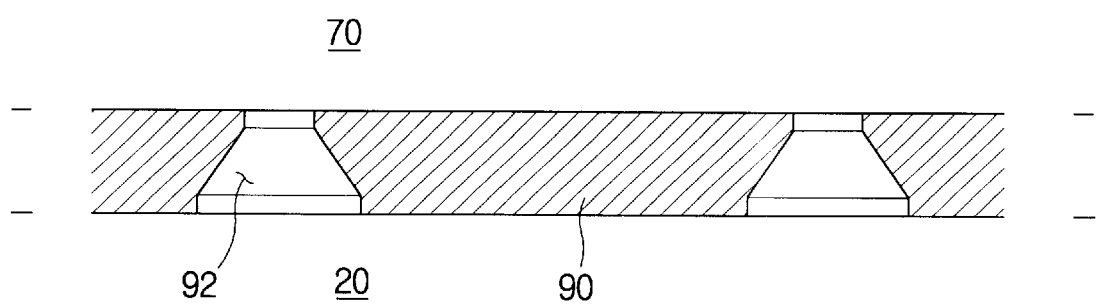
FIG. 7 is a partial sectional view of the air separation panel taken along the line VII—VII of FIG. 6, showing the cross-section of each of air guide holes formed on the air separation panel.

FIGS. 5 through 7 show an air separation panel 90 according to another embodiment of the present invention. The air separation panel 90 may be made of a nonmetallic material, including a plastic having a low heat conductivity, without affecting the objects of the present invention. However, the air separation panel 90 may also be of metal.

The air separation panel 90 made of a nonmetallic material has a lower heat conductivity than that of the aluminum air separation panel 80. Therefore, in an effort to compensate for the low heat conductivity of the air separation panel 90, a plurality of air guide holes 92 are formed on the air separation panel 90. Accordingly, air flowing upward in an storage compartment 20 due to natural convection is allowed to smoothly flow into an air storage chamber 70 through the plurality of air guide holes 92.

As shown in FIG. 7, each of the air guide holes 92 has a diameter which tapers so as to reduce the diameter toward the air storage chamber 70 from the storage compartment 20. That is, each of the air guide holes 92 has a cylindrical profile with a tapered mid-section which allows air to easily flow from the storage compartment 20 into the air storage chamber 70, while restricting a flow of air from the air storage chamber 70 to the storage compartment 20. Accordingly, the air resident in the air storage chamber 70 is separated from cooler air inside the storage compartment 20. Therefore, the air separation panel 90 of the present invention also reduces the temperature difference between areas of different heights in the storage compartment 20.

The kimchi refrigerator according to the present invention has an air storage chamber under a lower surface of a door which allows air having a raised temperature to be resident in the air storage chamber. The air storage chamber is coupled to an air separation panel which separates the air inside the air storage chamber from cooler air inside a storage compartment. The kimchi refrigerator according to the present invention reduces the temperature difference between areas of different heights in the storage compartment. Accordingly, it is possible to create a uniform temperature distribution in the storage compartment containing kimchi storage boxes. Therefore, the kimchi refrigerator according to the present invention provides market competitiveness because it cools and prevents over-fermentation of the kimchi located throughout the storage compartment.

While described in terms of a kimchi refrigerator, it is understood that the present invention would be useful in regulating temperature of any fermented item or in situations where air needs to remain at a constant temperature. For example, the present invention would be useful in regulating temperatures of fruits and vegetables so as to keep the fruits and vegetables fresh for a longer period of time without over-ripening the fruits and vegetables.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A kimchi refrigerator comprising:
   a cabinet defining a storage compartment and which is open at its top;
   an evaporator which cools air inside said cabinet and which is set within a sidewall of said cabinet and;
   a door which opens/closes the storage compartment and which is mounted on a top edge of said cabinet, said door comprising
       an air storage chamber provided under a lower surface of said door, and
       an air separation panel which separates air inside the storage compartment from air inside the air storage chamber and which is mounted to the lower surface of said door.

2. The kimchi refrigerator according to claim 1, wherein the air separation panel comprises an aluminum plate having a high heat conductivity.

3. The kimchi refrigerator according to claim 1, wherein the air separation panel comprises a material having a low heat conductivity, and air guide holes which guide air flowing upward from the storage compartment into the air storage chamber.

4. The kimchi refrigerator according to claim 3, wherein each of the air guide holes has a diameter which tapers in a direction from the storage compartment toward the air storage chamber so as to restrict a flow of the air from inside the air storage chamber into the storage compartment.

5. The kimchi refrigerator according to claim 4, wherein said door comprises a lower surface that includes a depression on its lower surface, and the lower surface is spaced apart from the air separation panel to form the air storage chamber.

6. The kimchi refrigerator according to claim 5, wherein said door further includes a locking groove formed along an edge of the depression, and
   the air separation panel includes a locking flange formed along an outer edge, the locking flange being inserted into the locking groove.

7. The kimchi refrigerator according to claim 1, wherein said door comprises a lower surface into which a depression is formed, and the lower surface is spaced apart from the air separation panel to form the air storage chamber.

8. The kimchi refrigerator according to claim 7, wherein said door further includes a locking groove formed along an edge of the depression, and
   the air separation panel includes a locking flange formed along an outer edge, the locking flange being inserted into the locking groove.

9. The kimchi refrigerator according to claim 1, wherein the air separation panel comprises material having a high heat conductivity so as to absorb heat from the air inside the storage compartment and dissipate the heat to the air inside the air storage chamber.

10. The kimchi refrigerator according to claim 9, wherein said door comprises a lower surface into which a depression is formed, and the lower surface is spaced apart from the air separation panel to form the air storage chamber.

11. The kimchi refrigerator according to claim 10, wherein said door further includes a locking groove formed along an edge of the depression, and the air separation panel includes a locking flange formed along an outer edge, the locking flange being inserted into the locking groove.

12. The kimchi refrigerator according to claim 11 wherein the air separation panel comprises an aluminum plate having a high heat conductivity.

13. A refrigerator comprising:

a cabinet including a storage compartment having an opening;

an evaporator which cools air inside said cabinet; and a door which opens/closes the storage compartment, said door comprising an air storage chamber provided under a lower surface of said door, wherein the air storage chamber separates air inside the air storage chamber from air inside the storage compartment so as to provide a uniform temperature distribution within the storage compartment.

14. The refrigerator according to claim 13, wherein the air storage chamber includes a lower surface comprising a heat conductive material so as to absorb heat from the air inside the storage compartment and air leaked into the storage compartment, and dissipate the heat to the air in side the air storage chamber.

15. The refrigerator according to claim 14, wherein the heat conductive material comprises aluminum.

16. The refrigerator according to claim 13, wherein the air storage chamber includes a lower surface made of a material having a low heat conductivity in which air guide holes are formed to guide air flowing upward in the storage compartment and air leaked into the storage compartment into the air storage chamber, while restricting a flow of the air inside the air storage chamber to the storage compartment.

17. The refrigerator according to claim 16, wherein the air flowing upward in the storage compartment is through convection and carries heat from the storage compartment.

18. The refrigerator according to claim 17, wherein each of the air guide holes has a diameter which tapers in a direction from the storage compartment toward the air storage chamber.

19. A door for a refrigerator including a cabinet having a storage compartment with an opening closed by the door, comprising:

a lower surface; and an air storage chamber pr vided under said lower surface, wherein:

said air storage chamber separates air inside said air storage chamber from air inside the storage compartments as to provide a uniform temperature distribution within the storage compartment, and said air storage chamber includes a bottom surface comprising a heat conductive material so as to absorb heat from the air inside the storage compartment and dissipate the heat to the air inside said air storage chamber.

20. A door for a refrigerator including a cabinet having a storage compartment with an opening closed by the door, comprising:

a lower surface; and an air storage chamber pr vided under said lower surface, wherein:

said air storage chamber separates air inside said air storage chamber from air inside the storage compartments as to provide a uniform temperature distribution within the storage compartment, and said air storage chamber includes a bottom surface comprising a material having a low heat conductivity and having air guide holes which guide air flowing upward in the storage compartment into said air storage chamber, while restricting a flow of the air inside said air storage chamber to the storage compartment.

21. The door of claim 20, wherein each of the air guide holes has a diameter which tapers to narrow the diameter in a direction from the storage compartment toward said air storage chamber.

* * * * *

UNITED STATES PATENT AND TRADEMARK OFFICE
CERTIFICATE OF CORRECTION

PATENT NO. : 6,619,070 B2
DATED : September 16, 2003
INVENTOR(S) : Kyu-Ho Shin

It is certified that error appears in the above-identified patent and that said Letters Patent is hereby corrected as shown below:

Column 8,
Line 12, after "chamber" change "prvided" to -- provided --.
Lines 15-16, change "compartments as to" to -- compartment so as to --.
Line 17, after "and" add paragraph break.
Line 28, after "chamber" change "prvided" to -- provided --.
Lines 31-32, change "compartments as to" to -- compartment so as to --.

Signed and Sealed this

Ninth Day of December, 2003

JAMES E. ROGAN
*Director of the United States Patent and Trademark Office*